(12) United States Patent
Vogel (10) Patent No.: US 6,338,452 B1
(45) Date of Patent: Jan. 15, 2002

(54) CENTERING PHOTOGRAPHIC MATERIAL SPOOLING DEVICE

(75) Inventor: Reinhard Vogel, Erkrath (DE)

(73) Assignee: Gretag Imaging AG, Regensdorf (CH)

( * ) Notice: Subject to any disclaimer, the term of this patent is extended or adjusted under 35 U.S.C. 154(b) by 0 days.

(21) Appl. No.: 09/396,465

(22) Filed: Sep. 15, 1999

(30) Foreign Application Priority Data

Sep. 15, 1998  (EP) .............................................. 98117483

(51) Int. Cl.[7] .......................... B65H 75/24; B65H 19/30
(52) U.S. Cl. .................. 242/571; 242/533; 242/578.1; 242/597.1
(58) Field of Search .................. 242/578.1, 597.1, 242/597.3, 533, 571

(56) References Cited

U.S. PATENT DOCUMENTS

| | | | | |
|---|---|---|---|---|
| 862,109 A | * | 7/1907 | Roth | 242/578.1 |
| 1,244,865 A | * | 10/1917 | Krohn | 242/578.1 |
| 2,898,137 A | * | 8/1959 | Kreske | 242/597.3 X |
| 3,833,181 A | * | 9/1974 | Watkins | 242/597.1 X |
| 3,838,829 A | | 10/1974 | Gotze | |
| 3,960,337 A | * | 6/1976 | Schroeder et al. | 242/597.3 |
| 4,500,047 A | * | 2/1985 | Merlin | 242/597.4 |
| 4,652,117 A | * | 3/1987 | Kogane et al. | 242/578.1 X |
| 4,991,785 A | * | 2/1991 | Kuo et al. | 242/597.1 |
| 5,154,365 A | * | 10/1992 | Schmitt | 242/597.1 |
| 5,232,174 A | * | 8/1993 | Sato et al. | 242/597.1 X |
| 5,451,010 A | | 9/1995 | Heuser | |

FOREIGN PATENT DOCUMENTS

| | | |
|---|---|---|
| DE | 4401959 | 7/1994 |
| DE | 4443423 | 6/1996 |
| GB | 1 575 283 | 9/1980 |

* cited by examiner

Primary Examiner—Michael R. Mansen
(74) Attorney, Agent, or Firm—Burns, Doane, Swecker & Mathis, LLP (57) ABSTRACT

A centering photographic material winding device for the winding or unwinding of a photographic material web onto or from a winding core. The winding device includes a winding core seat which is adapted for receiving a winding core moveable on the winding core seat. The winding core is centered by two push members which are coupled in their movement for the displacement and centering of a winding core received on the winding core seat between the push members in that the push members evenly move towards one another.

13 Claims, 5 Drawing Sheets

CENTERING PHOTOGRAPHIC MATERIAL SPOOLING DEVICE

BACKGROUND OF THE INVENTION

1. Field of the Invention

The invention relates to a centering photographic material spooling device, as well as a photographic material source or collector with such a spooling device and a photographic material developing machine with a spooling device in accordance with the invention and/or the photographic material source and/or collector in accordance with the invention.

2. Background Information

A reel is normally attached to a holding device for the winding or unwinding of photographic material, and the photographic material is fed thereto or removed therefrom along a fixed transport path. In order to guarantee the same position for the reel, a stop is normally provided for the reel so that the photographic material band can be transferred at a given point to the transport path or taken over thereby.

However, it is often required to wind or unwind photographic material webs or bands, for example, films or photographic paper, of different width. For that case, reels of different width are then used, the side wall disks thereof which are used for guiding the band having a correspondingly different spacing. If reels of different width are pushed onto the same seat up to the stop, a displacement of the center of the photographic material band or web results relative to the stop and relative to the whole transport path. This can be undesired under certain circumstances. For example, certain machines for the processing of photographic material require that the photographic material band is always fed centered about a preselected point. This is especially then the case when an optical processing of the photographic material band takes place wherein the band is to be centered around an optical axis to avoid optical distortion errors. A later lateral displacement of the photographic material band for the centering stresses the photographic material band or web because of the forces acting laterally thereon.

Because of the above-mentioned forces, windup systems or unwind systems were developed which can guide a photographic material web to a transport path or a machine independent of the width of the web or band and centered or can take it up in a centered manner from this machine in order to maintain the mechanical stress on the band as small as possible.

A conventional unwind system includes a reel with an inserted paper roller. The side wall disks with circular circumference are supported on axes which extend perpendicular to the direction of rotation of the side walls (see FIG. 1a). The reel is thereby freely displaceable in axial direction so that a fed out photographic material band can be centered by displacement of the reel.

It is thereby a disadvantage that the reel, because of its free movability along the axes, is not fixed in the direction of movement after centering of the reel and can thereby wonder relative to the center, for example, because of an uneven run of the photographic material web or band or uneven diameters of the side wall disks. This again results in lateral forces which actually were to be prevented and which can damage the photographic material band.

Furthermore, it is also often the case that the reels must be centered in the dark, for example, to avoid exposure of a not yet developed photographic material.

However, a centering of a conventional reel is very difficult in the dark. Subsequent to the unwinding process, the remaining windup roller must again be removed from the reel, for which the side wall disk must first be removed.

A conventional unwind device is rotated by a traction force which acts on the photographic material band. Since the traction force varies during the unwinding of the photographic material, these variations are transferred to the momentum mass of the reel. This results in fluctuations during the unwinding of the photographic material because of the inertia of the reel and the wound-on paper mass. This occurs especially when the photographic material web or band is clamped onto a traction web or band for unwinding, which then strongly accelerates the photographic material web or band.

The thereby created initial oscillation processes highly stress the photographic material band and can damage it. Furthermore, the thereby generated speed fluctuations can be transferred in an undesired manner to the further transport of the photographic material band.

A windup system generally used to date uses the same reel as the above-described unwind device. A windup roller is positioned onto the reel around which then a photo material band is wound up for the formation of a roll of photographic material. Contrary to the unwind device, the side wall disks in the windup device are not positioned on freely rotating axes, but on driven shafts. Those transfer through a frictional engagement, especially contact friction, a driving force onto the side wall disks. A rotation of the windup core is thereby achieved through the side wall disks in order to windup the photographic material.

The above-described disadvantage that the reel can freely wander after centering applies also to the windup device, so that even during the winding up, the photographic material can be stressed with undesired lateral forces. Also, as with the unwind device, the winding core must be removed after the completed windup process, whereby the side wall disks must be removed. The reason for this is especially that the side wall disks impede a further processing of the photographic material roll and that normally only the photographic material roll with the internal windup core is transferred to the further processing.

The driving force, which can be transferred, is also limited in the conventional windup device. As already mentioned, the driving force is transferred by way of friction engagement. However, because of the traction force of the paper, an undesired relative movement of the side wall edges relative to the shafts can occur so that a transition occurs from contact friction to slide friction and that the wind-up speed of the photographic material is thereby all of a sudden strongly reduced because of the reduced driving force. The drive shaft therefore slips and the delivered photographic material band is not taken up to the desired extent so that a jam can occur.

Furthermore, the contact friction between the side walls and the shafts is dependent on the weight of the reel and of the wound up photographic material and, thus, changes depending on the windup condition. In order to avoid the risk of a photographic material band jam, the photographic material band can only relatively loosely wound about the winding core for the above-mentioned reasons, since a photographic material band under tension could overcome the contact friction by way of the traction force caused thereby and could cause a jam. However, a loose paper roll has the disadvantage that it can pull apart by itself when not handled with great care, so that its lateral surfaces are not longer aligned. This can also occur during the winding up, so that the lateral edges of the photographic material then grind along the side walls whereby the photographic material is damaged.

SUMMARY OF THE INVENTION

It is an object of the invention to provide a photographic material winding arrangement which stresses the photographic material band as little as possible and is still easily manipulated. Furthermore, a corresponding photographic material source or photographic material collector and a photo developing machine with the same properties is to be provided.

The photographic material winding arrangement in accordance with the invention includes a winding core seat. This is constructed for receiving a winding core. Winding cores are, for example, constructed as rollers and normally include an especially cylindrical outer surface onto which a photographic material band is wound after the winding core is pushed onto the winding core seat. In order to allow a pushing of the winding core onto the winding core seat, the outer surface of the winding core seat is preferably at least in portions complementary to the inner surface of the winding core. The winding core seat can, thus, for example, have also a cylindrical outer surface, when the winding core has a cylindrical inner surface. The inner surface of the winding core can also have protrusions which engage grooves extending along the axis of rotation of the winding core in the surface of the winding core seat. A rotation of the winding core relative to the winding core seat about the axis of rotation of the winding core is perpendent in this manner. In order to hereby facilitate the pushing on, the grooves herefor provided on the winding core seat can progressively narrow so that pushing on of a winding core, it is brought into a form fitting connection with the winding core seat.

The winding core can also be formed fittingly fixed in another manner on the winding core seat. For example, the winding core can have depressions in its inner surface into which pins engage which can be driven out of the winding core seat in order to fix the winding core on the winding core seat both relative to the direction of rotation of the winding core and in direction of displacement of the winding core on the winding core seat. Since, as will be described further below, the winding core is centered in accordance with invention on the winding core seat, the relative location between the fixing protrusions and the fixing depressions in the centered condition can be predetermined and their required mechanics can be correspondingly constructed. This is especially then true when the position of the winding core relative to the winding core seat in the pushed on condition is also set in direction of rotation of the winding core by providing the above-described grooves on the winding core seat and corresponding protrusions on the inner surface of the winding core. The fixation can be achieved mechanically, as described above, but can also be achieved, for example, by magnetic forces. For example, the winding core seat can have magnets and the winding core can be made of the ferromagnetic material. Also, a series of north and south poles along the circumferential direction of the winding core seat prevent, for example, a rotation of the winding core relative to the winding core seat. The thereby achieved force transferring fastening of a winding core on the winding core seat can also be achieved in another manner in accordance with the invention, for example, push members in accordance with the invention can be used as further described in the following.

Preferably, the winding arrangement in accordance with the invention includes push members which are constructed to displace a winding core pushed onto a winding core seat parallel to a line or straight line along which the winding core is moveable on the winding core seat. The surface which contacts a winding core can therefore be constructed, for example, planar in order to contact the side edge surfaces of the winding core flat and to then displace them through contact pressure. The contact surface of a push member of both push members can also be constructed such that a form fit between the push member and the side edge surface of the winding core results, whereby herefor the side edge surface of the winding core is correspondingly constructed. By conical shaping of protrusions and/or depressions, a rotation of the winding core can be caused during approach of a push member to the side edge of the winding core in order to produce a form-fitting connection. A rotation of the winding core in contact with the push member and in direction of rotation of the winding core can be blocked by a form-fitting and/or force transmitting fixing. The displacement of the winding core by the push members can also be achieved contact free, for example, by magnetic repulsion forces.

In accordance with the invention, two push members are provided which move towards one another in a coupled movement. The movement takes place along a path along which the winding core is moveable on the winding core seat, so that the winding core is displaced when the push members are moved towards one another, except when the winding core is already centered. The movement of the push members preferably occurs symmetrically to a plane which extends perpendicular to the line of displacement of the winding core on the winding core seat. A centering of the winding core about the mentioned plane is then achieved by the even movement towards one another of the push members. Because of the movement coupling between the push members, the position of one push member is associated with a specific position of the other push member along the respective displacement path.

If the winding core after pushing onto the winding core seat is not centered, the next closest push member pushes the winding core, preferably in contact with a side edge surface of the winding core, until also the other side edge surface of the winding core engages the other push member.

With the construction of the push members in accordance with the invention, it is possible to simply push a winding core onto a winding core seat without having to watch the exact position of a winding core. A centering of the winding core on the winding core seat relative to a preselected plane is then achieved by movement of the push members towards one another. The push members can be operated through separate electric motors which are controlled such that the push members evenly move towards one another from preselected starting positions and in a coupled manner. The coupling of the movement can also be mechanically achieved. Especially such that upon manual activation of one push member toward a winding core, the other push member moves in the same manner (same speed) toward the winding core from respective starting positions. The mechanical coupling of the movement can especially be achieved through a spindle as will be described in more detail further below.

In accordance with the invention, a preselected force is provided for the displacement of the push members so that the contact and slide friction of the pushed on winding core can be overcome during displacement on the winding core seat. Preferably, the force is selected such that a force transmitting engagement of preselected strength results between the winding core and the push-members. The strength of the force transmitting engagement is preferably selected such that a preselected drive force for rotation of the windup core can be transferred from the push members to the windup core. For example, the surface of the lateral edges of the windup core and of the push members can be made rough herefor.

In accordance with the invention, the windup core can be driven for rotation with the push members and/or the windup core seat, by fixing the windup core on the windup core seat and/or fixing by way of the push members. The push members can here also be connected with the windup core seat and the windup core seat can rotate with the push members, whereby the fixing of the windup core for driving force transfer is carried out by way of the push members. Because of the form fitting and/or force transmitting fixation of the windup core in accordance with the invention relative to the push members and/or the windup core seat and with force transmitting fixing because of an adjustable strength of the force transmitting connection, a drive force of any strength (for example, any pressing force of the push members) can be transferred to the windup core. This makes it possible, contrary to the prior art, to actively support by a drive the unwind process of a photo material roll from the windup core to thereby contribute to an even unwinding of the wound up material. During the winding up of the material onto the windup core, a drive force of adjustable strength can be exerted on the windup core so that photographic material can be tightly wound onto the windup core at a preselected tension, especially at a higher tension than in the prior art.

In order to be able to comfortably push a windup core before the centering onto the windup core seat, at least one push member is preferably removable, especially in the vicinity of the surface of the windup core seat for the pushing on of the windup core and from the space necessary therefore, and after the pushing on once again supplied. Preferably, at least one push member is constructed such that, in a starting position of the push members, it is reset into recess provided therefor for the unobstructed pushing on of the windup core and is extended out of the recess by way of mechanics during the pushing together of the push members to thereby protrude from the surface of the windup core seat in order to engage a pushed on windup core for displacement.

The windup core seat is preferably made of two parts and includes two core supports, whereby the windup core is pushed onto both core supports. The windup core supports are preferably constructed such that one windup core support can be inserted into the other windup core support up to a stop. The outermost circumferential points of both windup core supports preferably span, for example, a cylindrical surface onto which the windup core can be pushed.

Preferably, respectively one of the push members is associated with one of the windup core supports and the displacement of each push member is coupled to the displacement of the respectively associated windup core support. The dimensions of the windup core supports, are preferably selected such that when the windup core has a popular width, the left edge region of the windup core comes to sit on the left windup core support and the right edge region of the windup core on the right windup core support. During the pushing together of the push members coupled with the windup core supports this results in a good guiding of the pushed on winding core so that a jamming of the winding core during displacement is counteracted.

A spindle is preferably provided for the coupling of the movement of the push members which are connected with the two windup core supports. The spindle is rotated in order to evenly move the push members apart or together. To achieve this, each windup core support is provided with an inwardly positioned nut which engages the spindle. Furthermore, the spindle is provided with a left hand thread and a right hand thread and one nut is provided with a right hand thread while the other nut is provided with a left hand thread. Depending on the direction of rotation of the spindle, the nuts are therefore moved together or apart, unless a rotation of the nuts is prevented or locked. The threads are preferably cut such that the nuts upon rotation of the spindle move with same speed with respect to the absolute value of the speed.

The rotation lock for the nuts can preferably be unlocked. The lock is preferably unlocked when the winding core has been displaced so far by the push members that it is centered. The pressure against the edges of the winding core in this condition causes a counterforce onto the push members which push against the lateral edge surfaces of a winding core. This counterforce is preferably detected, for example, by way of the drive force which is required to rotate the spindle. In this condition, the lock is released so that upon further rotation of the spindle, the nuts rotate together with the respective winding core supports and the push members, whereby the winding core is held by the push members for force transmission. The handedness of the threads of the nuts and the spindle is preferably selected such that, in case of a relative movement between the winding core side surfaces and the push members because of an insufficient force transmitting contact, the push members are moved further towards one another until a force transmitting contact is again achieved. The push members therefore automatically tighten around the winding core upon rotation of the winding core depending on the required force, so that always a force transmitting contact is achieved for sufficient strength to drive the winding core.

If the rotation of the winding core is delayed relative to the rotation of the spindle, these delays are transferred through the push members and the core supports onto the nuts, so that a relative movement between nut and spindle results, which causes a further pulling together of the pins about the winding core until the winding core rotates evenly with the spindle.

Furthermore, a photographic material buffer is provided in accordance with the invention. If the winding arrangement serves as unwind device, the photographic material buffer is positioned on the unwind side of the winding core, which means the photographic material band unwound from the winding core is guided through the photographic material buffer. If the photographic material band is now pulled from the photographic material buffer with varying speed, for example, during an acceleration process, the photographic material buffer can add material in order to so prevent that the above-described inertia forces act on the photographic material band because of the momentum mass of the photographic material roll (initial oscillation effect). The abrupt acceleration can thereby be dampened in order to reach the desired speed possibly without fluctuation. In order to ensure that always sufficient photographic material band is present in the photographic material buffer, a control device is provided in accordance with the invention which controls the speed with which the photographic material band is unwound from the fixed winding core by rotation of the winding core seat and/or the push members. This was not possible according to the prior art, since no active rotation of the winding core in the unwind arrangement was provided.

During winding up of the photographic material band, the drive of the winding core in accordance with the invention which is significantly stronger than in the prior art, also advantageously cooperates with the photographic material buffer. Because of the stronger drive forces for rotation of the winding core, the photographic material band in the photographic material buffer can be exposed to a significantly higher tension so that a tighter winding up is made possible.

It is a further advantage of the invention that because of the tight winding, no reel side walls are required and, thus, also need not be removed for removal of the winding core. Thus, the winding core can be immediately removed with the paper roll wound thereon from the winding device in accordance with the invention, or directly placed thereon.

The winding device in accordance with the invention is preferably used to form a photographic material source and/or collector. It includes the winding device in accordance with the invention with installed winding core. If photographic material is on the winding core, it is guided to an inlet or outlet (e.g., input/output 700 in FIG. 5), advantageously especially through the above-mentioned photographic material buffer. It is an essential advantage of the photographic material source or pickup in accordance with the invention that a winding core with or without photographic material band can be easily installed and removed, and that the photographic material band is always taken up or supplied exactly centered because of the centering of the winding core.

The above-described winding device and/or the above-described photographic material source and/or collector are preferably used especially in a photo developing machine. Especially the centering upon placement of a photographic material roll in the winding device in accordance with the invention is thereby an advantage, since the insertion can easily be carried out in the dark because of the centering. If the winding device or photographic material pickup is used on the output side of the photo developing machine, significantly tighter and more evenly wound (no lateral displacement) photographic material rolls can be produced.

Brief Description of the Drawings

An embodiment of the invention will be described in the following with reference to the drawings. Further advantageous features of the invention are thereby disclosed.

Detailed Description of the Preferred Embodiment

Figure 1A:
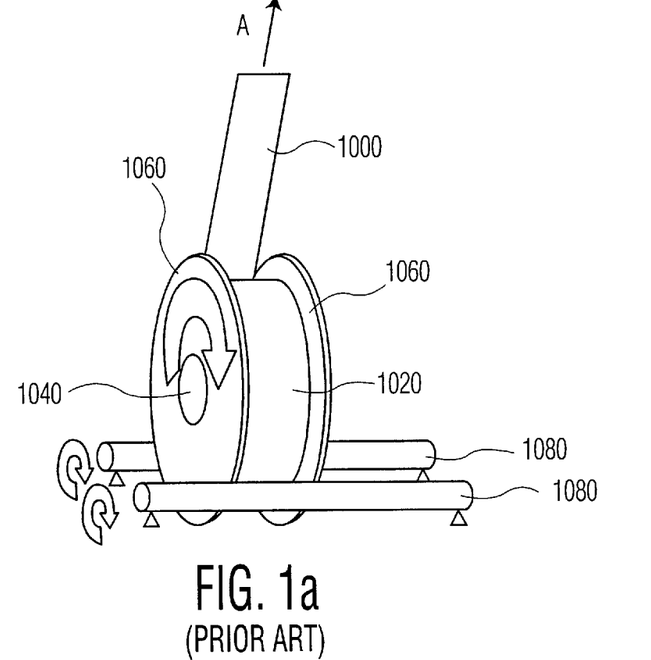
FIG. 1a shows an unwind system in accordance with the prior art.

FIG. 1a shows an unwind system according to the prior art. A photographic material band or web 1000 is pulled off a photographic material roll 1020 in direction A and with a preselected traction force, for example, by way of a traction band or leader band or leader cartridge. The photographic material roll is on a winding core 1040 and is laterally delimited by circular side wall disks 1060. The side wall disks 1060 rest on rotatable axes 1080. The reel with the side wall disks 1060 and the winding core 1040 is moveable transverse to its direction of rotation along the axis 1080.

The unwind system according to the prior art, contrary to the present invention, does not provide an automatic centering and has a tendency to wonder along the axes 1080.

Figure 1B:
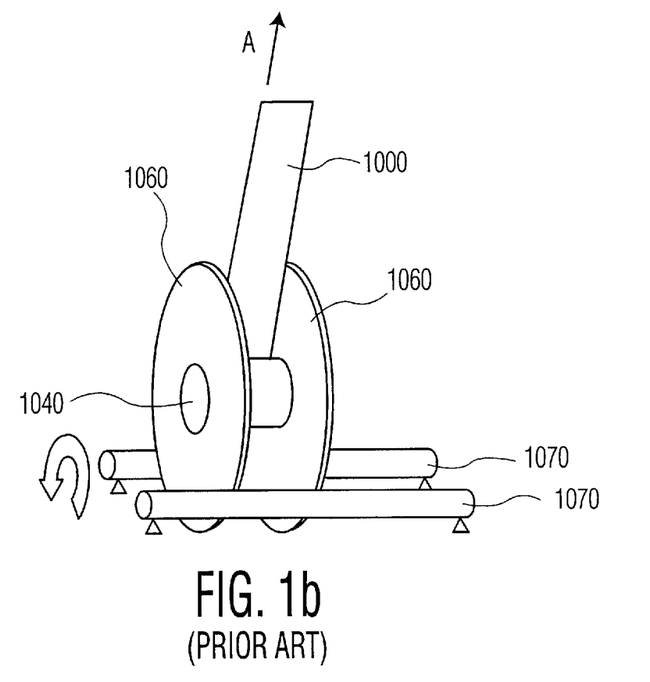
FIG. 1b shows a winding system according to the prior art.

FIG. 1b shows a winding system according to the prior art. The photographic material band or web 1000 is wound up against a direction A. A traction force of the photographic material band acts in direction A. It is required for a tight winding of the photographic material band. Equal parts as in FIG. 1a are references with the same reference numerals. However, instead of the axes 1080, shafts 1070 are provided which transfer a driving force onto the side wall disks 1060 for the winding up of the photographic material band. However, as already discussed above, the driving force which can be transferred is small and depends on the fill condition and the associated weight of the reel.

Figure 2:
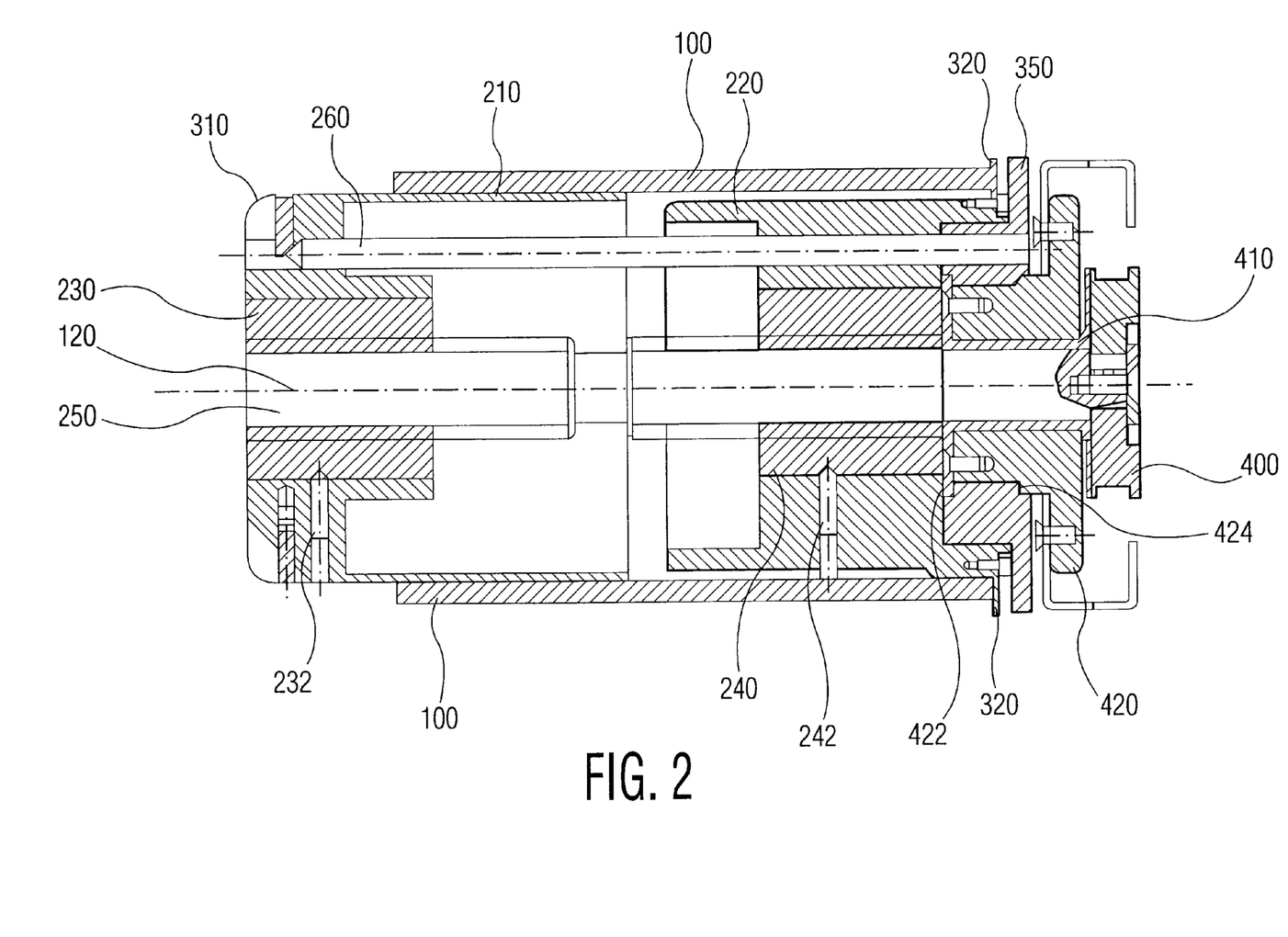
FIG. 2 shows a longitudinal section through a winding device in accordance with the invention.

FIG. 2 shows the winding device in accordance with the invention in longitudinal section along the spindle axis 120 of the spindle 250. The spindle 250 is driven by way of a pulley 400. A locking device mount 420 is supported on the driveable spindle 250 and directly adjacent the pulley 400 for rotation about the spindle axis 120. The locking device mount 420 receives a locking device 350 in such a way that a displacement of the locking device in axial direction is prevented because of the shoulders 422 and 424.

The winding device of FIG. 2 is in a starting position, whereby a winding core 100 has already been pushed onto the core supports 210 and 220 of the winding device. The winding core 100 abuts at the right against the right push member 320. The left push member 310 is still recessed into the core support 210. The right core support 220 is connected with a nut 240 by way of a pin 242 for common rotation. Correspondingly, the nut 230 is connected by way of a pin 232 with the core support 210 for rotation therewith.

A pin 260 penetrates both core supports 210 and 220 and the locking device 350. Thus, if rotation of the locking device 350 about the axis 120 is prevented, the nuts 230 and 240 can also the rotate about the spindle axis.

The spindle 250 has a left hand thread and a right hand thread. The nut 230 has a left hand thread and a nut 240 has a right hand thread, or the opposite. A rotation of the spindle about the spindle axis therefore results, depending on the direction of rotation, in a movement of the nuts towards one another or away from one another, if their rotation has been blocked because of a holding of the locking device 350 by way of the pin 260.

If rotation of the locking device 350 about the bearing 410 is not prevented, the nuts rotate together with a spindle axis.

The left push member 310 is in FIG. 2 recessed into the core support 210. If the core supports are moved towards one another by rotation of the spindle, the left tip of the pin 260 pushes the left push member 310 out of the left core support 210. The winding core is pushed to the left by the right push member 320, while the left push member which now protrudes from the core support 210 moves towards the left edge of the winding core 100. This process continues until the left push member as well as the right push member respectively engage the left and right sides of the winding core 100.

In the above-mentioned condition, the torque to be produced by the drive motor for continued rotation of the spindle axis increases. It can be detected therewith that now the winding core 100 is held on the core supports 210 and 220 between the left push member 310 and the right push member 320 for force transmission. A portion of the core support 220 has a smaller outer diameter than the core support 210 such that the core support 220 can be partly inserted into the core support 210.

If the winding core 100, which is now held for force transmission by the push members 310 and 320, is to be rotated, a free rotation of the locking device 350 about the axis 120 must only be allowed and the spindle further driven, since the pin 260 then no longer prevents the rotation of the nuts and core supports, but also rotates about the spindle axis.

Figure 3:
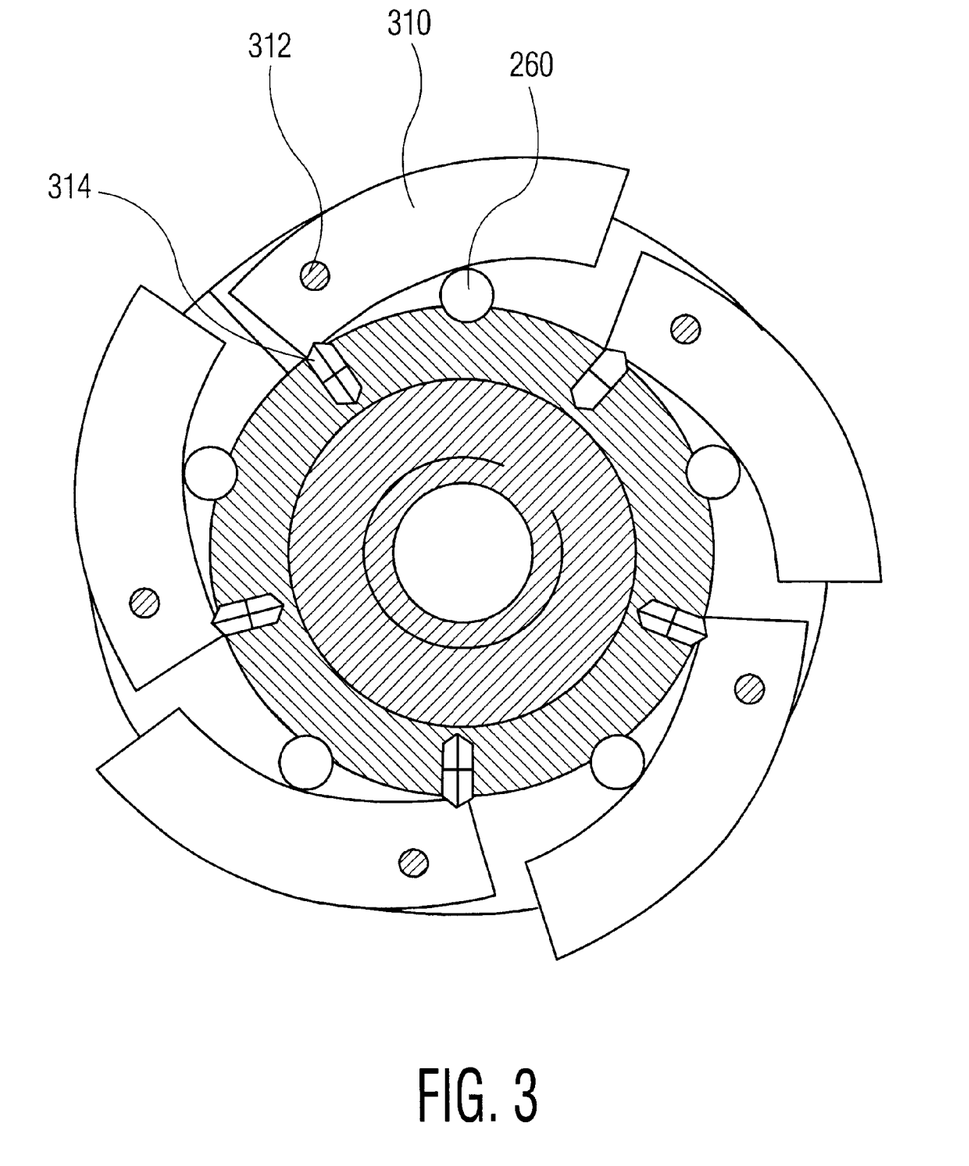
FIG. 3 shows a cross section through the winding device in accordance with the invention, and especially the recessing mechanism for a push member.

FIG. 3 shows a cross section along a line which extends in FIG. 2 from top to bottom through the push member 310.

The push member 310 is pushed outwardly because of an oblique engagement surface of the pin 260 and a complementary shaped opposite surface of the push member 310, when the core support 210 is moved in direction towards the core support 220. The left push member 310 thereby rotates about a fulcrum 312 so that the push member 310 protrudes from the outer surface of the core support 210 for gripping of the winding core 100.

In the position shown in FIG. 2, the push member 310 is recessed because of the action of the spring 314 which pushes the push member 310 back into the starting position as long as the pin 260 does not act thereon.

Figure 4:
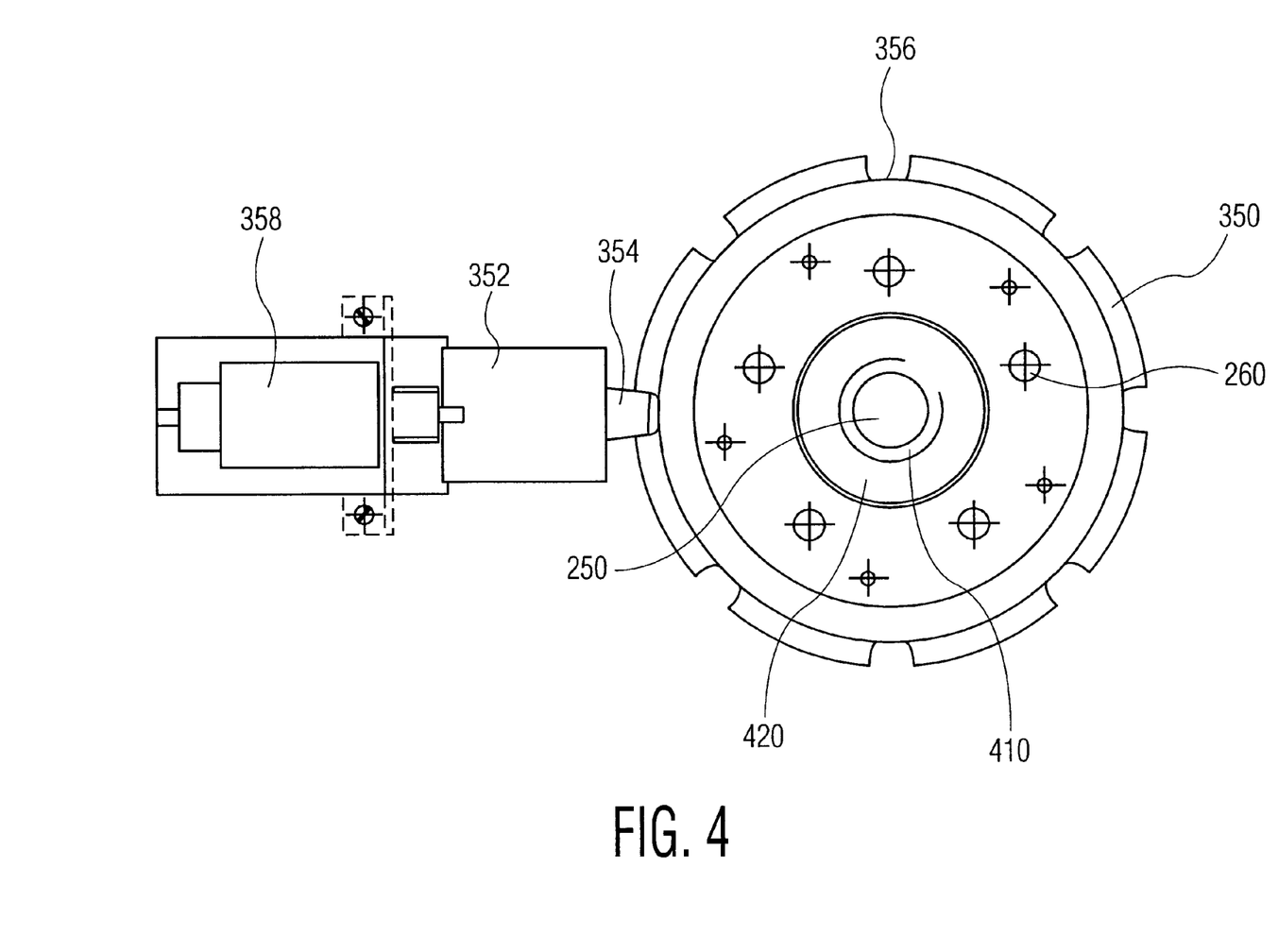
FIG. 4 shows a mechanism for the blocking of the locking arrangement.

FIG. 4 illustrates a mechanism for preventing a rotation of the locking device 350 together with a locking device mount 420 about the bearing 410. As above, the same reference numerals refer to the same parts. A lock actuator 352 pushes a bolt 354 into a groove 356 with the action of a solenoid 358 and thereby prevents a rotation of the locking device 350 when the spindle 250 rotates. If the bolt 354 is retracted, the locking device 350 can rotate freely. The rotation is transferred from the spindle to the nuts to the core support, and from there to the pin 260 to locking device 350 and is no longer blocked thereby.

Figure 5:
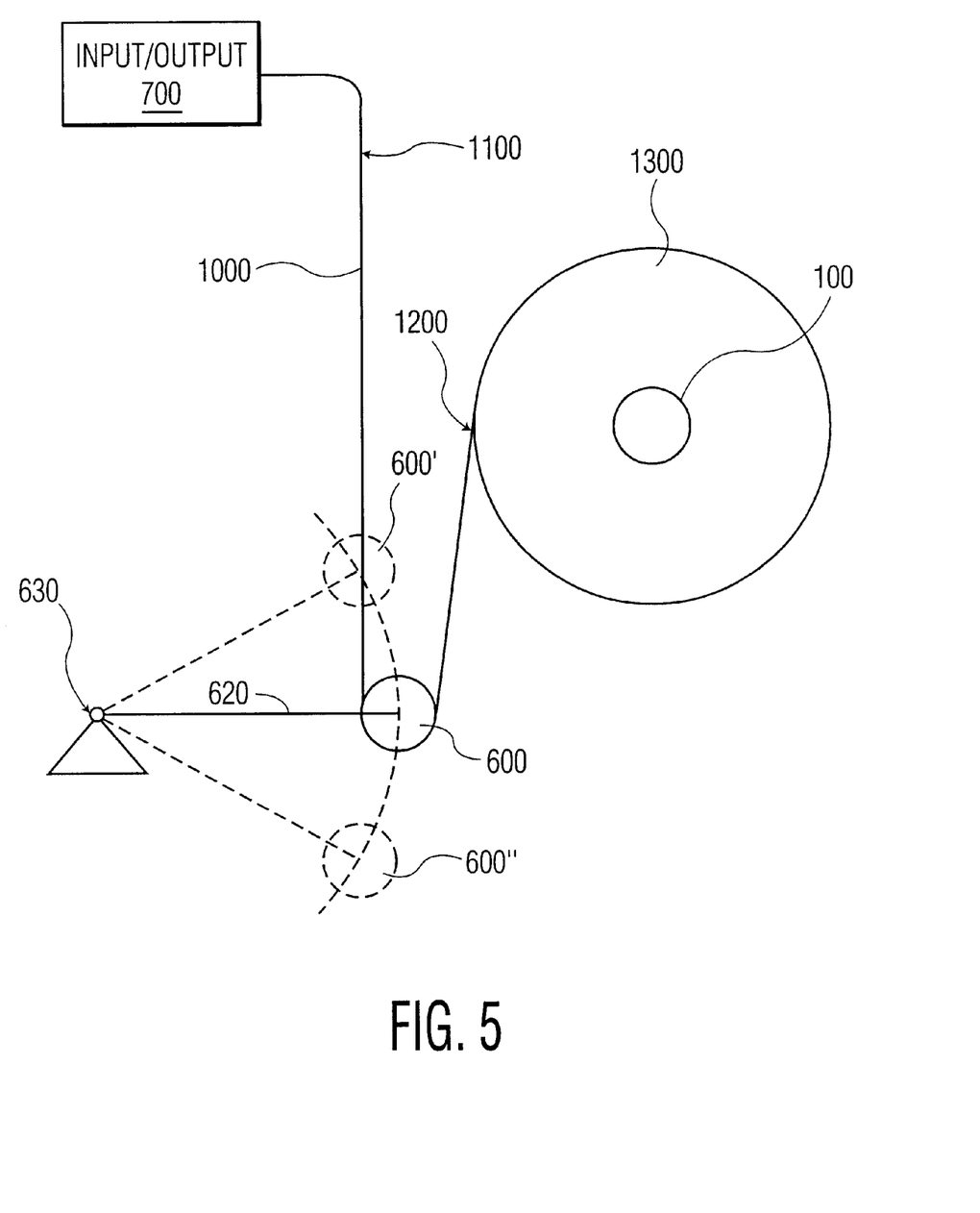
FIG. 5 shows the principle of a dancer control.

FIG. 5 shows a buffer storage for photographic material which in the illustrated embodiment includes only one redirecting roller 600 which is also called dancer roller or "dancer". The photographic material band 1000 is redirected by the dancer roller 600. Depending on the location of the dancer roller, the length of the photographic material band between point 1100 and point 1200 is extended. This length is used for the buffering of the photographic material. At the point 1200, the photographic material band or web changes into a photographic material roll 1300, which sits with a winding core 100 on the winding core seat of the winding device in accordance with the invention.

The above-described buffer storage and winding device can be used in a photo developing machine. Especially the centering upon placement of a photographic material roll in the winding device in accordance with the invention is thereby an advantage, since the insertion (for example, into an input/output 700 of a photo developing machine) can easily be carried out in the dark because of the centering. If the winding device or photographic material pickup is used on the output side of the photo developing machine (for example, via input/output 700), significantly tighter and more evenly wound photographic material rolls can be produced.

The length of the photographic material band available for the buffering can be determined by way of the position of the dancer roller 600, which, by way of its inherent weight, tightens the photographic material. Furthermore, the desired traction, for example, during the winding up of the photographic material band, can be set by way of the weight of the dancer roller.

The position of the dancer roller 600 can be determined, for example, by way of an arm 620 which is supported at 630. The arm 620 can be coupled, for example, with a potentiometer so that the rotation speed of the driven winding core can be changed depending on the angular position of the potentiometer.

If the arrangement shown in FIG. 5 is used, for example, for the unwinding of photographic material, the unwinding speed is increased by increasing the rotation speed of the winding core or the spindle when the dancer is lifted, for example, to the upper position 600' shown in broken lines, in order to again increase the length of the photographic material band in the storage. If the dancer takes up a lower position designated 600", more band material is present so that preferably the unwind speed can be reduced. Highly fluctuating traction forces on the photographic material can be prevented in this manner, whereby the photographic material band is preserved.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. Centering photographic material winding device for at least one of winding and unwinding of a photographic material web onto or from a winding core, comprising:

a winding core seat which is constructed for receiving a winding core moveable thereon;

at least two push members coupled in their movement and being movable for moving a winding core received on the winding core seat and positioned between the push members; and a rotation lock which prevents a rotation of the winding core seat about the axis when in a locked position, and which allows a rotation of the winding core seat about the axis when in an unlocked position.

2. Centering photographic material winding device according to claim 1, wherein the push members are shaped and constructed for at least one of a form fitting fixation and a force transmitting fixation of a winding core.

3. Centering photographic material winding device according to claim 1, wherein the two push members are moveable towards one another against a preselected force to permit holding for force transmission of a winding core received between and centered by the push members.

4. Centering photographic material winding device according to claim 3, wherein the push members are connected with a winding core seat.

5. Centering photographic material winding device according to claim 4, wherein at least one of the at least two push members in its starting position is recessed into the winding core seat and moves out of the winding core seat upon moving together of the push members for pushing and centering a winding core received therebetween.

6. Centering photographic material winding device according to claim 1, wherein at least one of the winding core seat and the push members are adapted for rotating a centered winding core for at least one of the winding and unwinding of photographic material onto or from the winding core.

7. Centering photographic material winding device according to claim 1, wherein the winding core seat includes:

two winding core supports for pushing on and displacement of a winding core which are moveable along a displacement axis line and are respectively connected with one of the push members.

8. Centering photographic material winding device according to claim 7, comprising:

a spindle with left hand and right hand threads;

a nut with a left hand thread; and a nut with a right hand thread, wherein the rotation lock includes a releasable locking device for preventing rotation of the nuts about the spindle, and wherein the nuts sit on the spindle at spaced apart locations and respectively one nut and one push member are connected with one of the two winding core supports.

9. Centering photographic material winding device according to claim 8, wherein the locking device is released when a preselected torque for rotation of the spindle is exceeded.

10. Centering photographic material winding device according to claim 1, further comprising a photographic material buffer for storing photographic material and through which the photographic material can be fed to or removed from a winding core; and a control device which controls rotation of at least one of the winding core seat and the push members for receiving photographic material from the buffer or supplying photographic material to the buffer so that a change of length of the photographic material in the buffer is counteracted by a change in the rotation speed.

11. Centering photographic material winding device according to claim 1, wherein said at least two push members are movable for centering a winding core received on the winding core seat.

12. Photographic material device for at least one of providing a source of photographic material and receiving a photographic material, including:

a photographic material winding device and a winding core about which the photographic material can be wound, said photographic material winding device comprising:

a winding core seat which is constructed for receiving said winding core moveable thereon;

at least two push members coupled in their movement and being movable for moving said winding core received on the winding core seat and positioned between the push members; and a rotation lock which prevents a rotation of the winding core seat about the axis when in a locked position, and which allows a rotation of the winding core seat about the axis when in an unlocked position.

13. Photo developing machine for developing photographic material, including a photographic material winding device for at least one of winding and unwinding of a photographic material web onto or from a winding core, the device comprising:

a winding core seat which is constructed for receiving a winding core moveable thereon;

at least two push members coupled in their movement and being movable for moving a winding core received on the winding core seat and positioned between the push members; and a rotation lock which prevents a rotation of the winding core seat about the axis when in a locked position, and which allows a rotation of the winding core seat about the axis when in an unlocked position.

* * * * *